US010664450B2

(12) United States Patent
Aithal et al.

(10) Patent No.: US 10,664,450 B2
(45) Date of Patent: May 26, 2020

(54) DECOUPLING THE COMMIT AND REPLAY OF METADATA UPDATES IN A CLUSTERED FILE SYSTEM

(71) Applicant: VMWARE, INC., Palo Alto, CA (US)

(72) Inventors: Prasanna Aithal, Bangalore (IN); Asit Desai, Palo Alto, CA (US); Bryan Branstetter, Palo Alto, CA (US); Pradeep Krishnamurthy, Bangalore (IN); Prasad Rao Jangam, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 325 days.

(21) Appl. No.: 15/613,300

(22) Filed: Jun. 5, 2017

(65) Prior Publication Data

US 2018/0253442 A1 Sep. 6, 2018

(30) Foreign Application Priority Data

Mar. 6, 2017 (IN) .............................. 201741007809

(51) Int. Cl.
*G06F 11/14* (2006.01)
*G06F 16/176* (2019.01)
*G06F 9/46* (2006.01)

(52) U.S. Cl.
CPC .......... *G06F 16/1774* (2019.01); *G06F 9/466* (2013.01); *G06F 11/1471* (2013.01); *G06F 11/1435* (2013.01)

(58) Field of Classification Search
CPC .. G06F 16/1774; G06F 9/466; G06F 11/1471; G06F 11/1435; G06F 17/30067; G06F 9/545; G06F 11/302
See application file for complete search history.

(56) References Cited

U.S. PATENT DOCUMENTS

| 8,924,352 | B1 * | 12/2014 | Andruss | G06F 11/1461 |
| | | | | 707/640 |
| 9,460,177 | B1 * | 10/2016 | Pawar | G06F 16/1865 |
| 9,542,396 | B1 * | 1/2017 | Pawar | G06F 11/1471 |
| 9,697,219 | B1 * | 7/2017 | Wang | G06F 16/1734 |
| 2009/0119304 | A1 * | 5/2009 | Preslan | H04L 67/1097 |
| 2016/0378818 | A1 * | 12/2016 | Marcotte | G06F 16/2379 |
| | | | | 707/703 |
| 2018/0314728 | A1 * | 11/2018 | Chaurasia | G06F 11/1471 |

* cited by examiner

*Primary Examiner* — Belix M Ortiz Ditren
*Assistant Examiner* — Suman Rajaputra

(57) ABSTRACT

Techniques for decoupling the commit and replay of file system metadata updates in a clustered file system (CFS) are provided. In one embodiment, a CFS layer of a computer system can receive a file I/O operation from a client application, where the file I/O operation involves an update to a file system metadata resource maintained on persistent storage. In response, a journaling component of the CFS layer can execute a commit phase for committing the update to a journal on the persistent storage. The CFS layer can then return an acknowledgment to the client application indicating that the file I/O operation is complete, where the acknowledgement is returned prior to completion of a replay phase configured to propagate the update from the journal to one or more locations on the persistent storage where the file system metadata resource is actually stored.

21 Claims, 6 Drawing Sheets

US 10,664,450 B2

DECOUPLING THE COMMIT AND REPLAY OF METADATA UPDATES IN A CLUSTERED FILE SYSTEM

RELATED APPLICATIONS

Benefit is claimed under 35 U.S.C. 119(a)-(d) to Foreign Application Serial No. 201741007809 filed in India entitled "DECOUPLING THE COMMIT AND REPLAY OF METADATA UPDATES IN A CLUSTERED FILE SYSTEM", on Mar. 6, 2017, by VMware, Inc., which is herein incorporated in its entirety by reference for all purposes.

BACKGROUND

A clustered file system (CFS) is a file system that can be mounted and accessed by multiple client nodes (such as multiple host systems in a cluster) concurrently. As part of providing concurrent access, a CFS needs to ensure that each client node has a consistent view of the file system's metadata. Examples of such file system metadata include, e.g., file names, directory information, file and directory attributes, and so on.

Existing CFSs generally guarantee metadata consistency via a process known as journaling. Journaling consists of two phases: a commit phase and a replay phase. During the commit phase, the CFS processes an update to a file system metadata resource by applying the update to a version of the resource in memory (e.g., in system RAM) and then writing the modified in-memory resource to an on-disk journal. During the replay phase, the CFS propagates the metadata resource recorded in the journal to the actual location(s) of that resource on disk. With this two-phase approach, the CFS can ensure that the on-disk version of the metadata resource remains in, or can be restored to, a consistent state in various system or network failure scenarios.

While the commit and replay phases are occurring, the CFS locks the metadata resource using an on-disk lock so that it cannot be accessed by clients during that period. To minimize the amount of time that the metadata resource is locked, existing CFSs typically perform the commit and replay phases synchronously (i.e., the replay immediately after the commit). Once the replay phase is finished, the CFS returns an "I/O complete" acknowledgement to the client application that initiated the I/O causing the metadata update. Unfortunately, this means that the initiating application must wait for both phases to complete before moving on with its program execution, which increases the latency of its I/O operations and reduces the overall application performance.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques that enable the journaling component of a CFS to decouple (i.e., desynchronize) the commit and replay of file system metadata updates. With these techniques, the commit phase can continue to be performed in the context of a client application's I/O path, but the replay phase can be performed asynchronously (e.g., at a later point in time). Stated another way, for a given I/O operation that involves a file system metadata update, the CFS can return an I/O complete acknowledgement to the initiating client application once the commit phase for the metadata update is finished, without waiting for the replay phase to also finish. Accordingly, these techniques can substantially reduce the I/O latency experienced by the client application and thereby improve its performance.

The foregoing and other aspects of the present disclosure are described in further detail in the sections that follow.

2. System Environment

Figure 1:
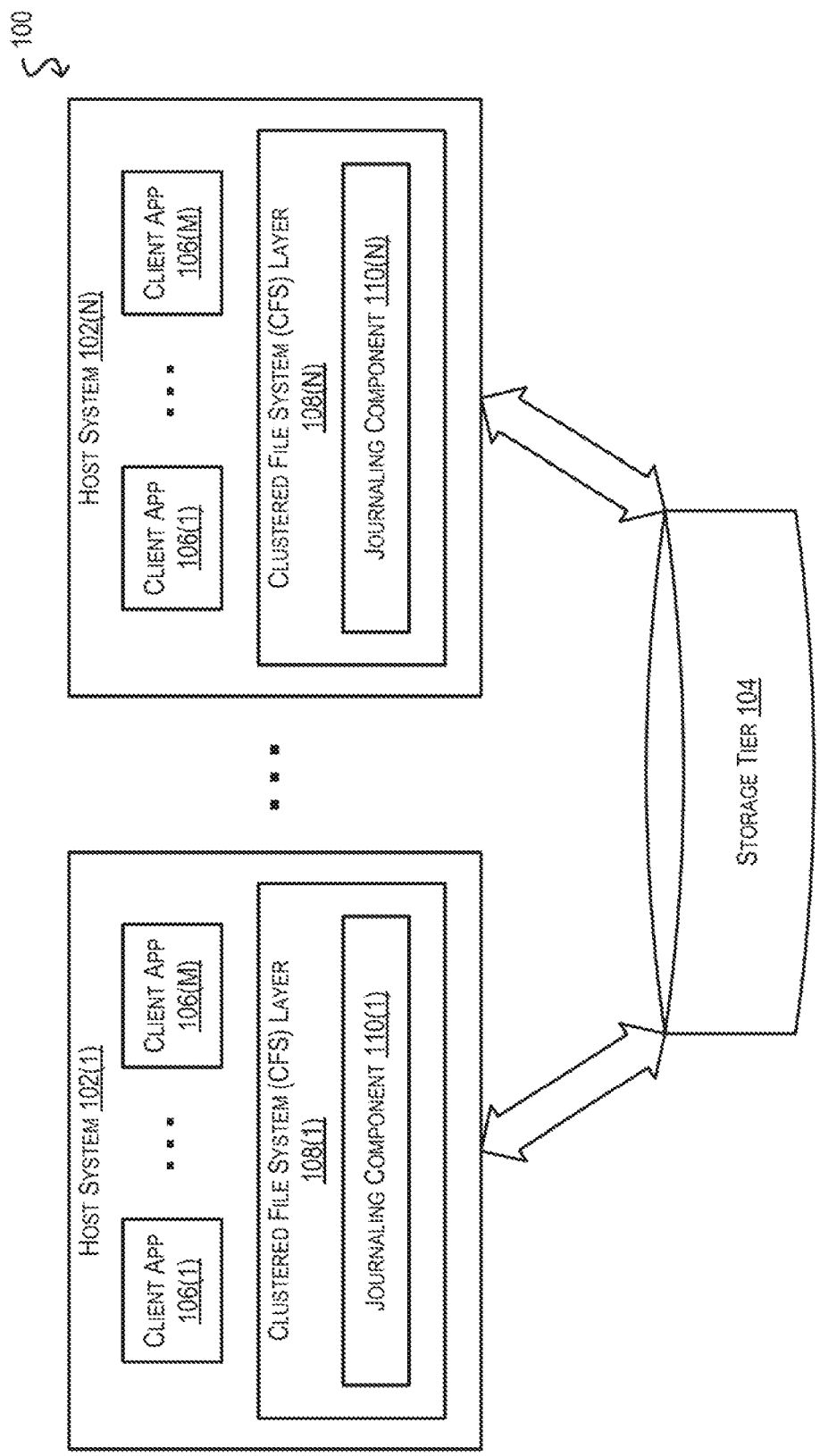
FIG. 1 depicts a system environment in which embodiments of the present disclosure may be implemented.

FIG. 1 depicts a system environment 100 in which embodiments of the present disclosure may be implemented. As shown, system environment 100 comprises a plurality of host systems 102(1)-(N) that are connected to a persistent storage tier 104. Storage tier 104 may be implemented using, e.g., one or more networked storage arrays and/or other types of nonvolatile storage components known in the art. Each host system 102 includes a number of client applications 106(1)-(M) that are configured to read persistent data from, and write persistent data to, storage tier 104. Each host system 102 also includes a clustered file system (CFS) layer 108 that is configured to track/organize the data stored on storage tier 104 and manage the file I/O interactions between client applications 106 and storage tier 104.

To ensure file system metadata consistency, CFSs generally implement a two-phase journaling process (via a journaling component 110 shown as part of CFS layer 108) for file system metadata updates that arise out of I/O operations initiated by clients. As used herein, "file system metadata" is metadata pertaining to the namespace(s) of the file system and may include, e.g., file system tree information, file names, extended attributes (i.e., attributes on files and directories), directory information, volume information, snapshots, clones, access control lists (ACLs), and other structures used to update this information (e.g., logical and physical logs).

By way of example, assume client application 106(1) of host system 102(1) issues a write to a file F1 on storage tier 104 that requires an update to two file system metadata resources: (A) a file size parameter for F1 and (B) a block allocation list for F1. In this case, journaling component 110(1) of host system 102(1) can first execute a commit phase in which component 110(1) retrieves metadata resources (A) and (B) from storage tier 104, caches the resources in an in-memory cache (known as a filesystem resource cache, or FRC), updates the in-memory resources in accordance with the file I/O, and writes the updated resources, in the form of a transaction, to a persistent journal on storage tier 104. Journaling component 110(1) can then execute a replay phase in which component 110(1) propagates the versions of resources (A) and (B) recorded in the journal to their actual on-disk locations.

As noted in the Background section, existing CFSs typically perform these commit and replay phases in a synchronous fashion within the context of the initiating client's I/O path. Thus, in the example above, journaling component 110(1) would perform the commit and replay of the updates to metadata resources (A) and (B) synchronously as part of client application 106(1)'s write to file F1, and client application 106(1) would only receive an acknowledgement of write completion after both the commit and replay phases are completed. While this minimizes the amount of time for which metadata resources (A) and (B) are locked on disk, this also increases the latency of the application's I/O operations. This impact on I/O latency can be particularly significant in cases where a file I/O requires multiple metadata updates (and thus multiple I/Os to disk during the replay phase).

Figure 2:
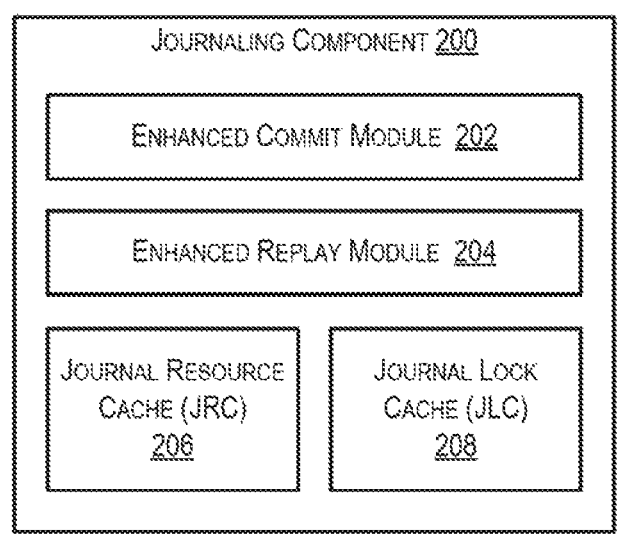
FIG. 2 depicts a journaling component comprising an enhanced commit module, an enhanced replay module, a Journal Resource Cache (JRC), and a Journal Lock Cache (JLC) according to an embodiment.

To address the foregoing and other similar issues, FIG. 2 depicts a modified version of journaling component 110 (i.e., journaling component 200) that comprises an enhanced commit module 202, an enhanced replay module 204, a first cache component referred to as a journal resource cache (JRC) 206, and a second cache component referred to as a journal lock cache (JLC) 208. JRC 206 and JLC 208 can be maintained in the system RAM of the host system executing journaling component 200.

In various embodiments, the modules/components shown in FIG. 2 can work in concert to enable an enhanced journaling process (comprising an enhanced commit workflow and an enhanced replay workflow described in sections 3 and 4 below) that effectively decouples the execution of the commit phase from the execution of the replay phase. For instance, returning again to the example of file F1 above, the modules/components of FIG. 2 can interoperate in a manner that allows client application 106(1) to proceed with its program execution as soon as the commit of metadata resources (A) and (B) is finished, without waiting for the replay phase to occur. Thus, the overall time needed to complete the write to F1, from the perspective of application 106(1), can be substantially reduced. Further, this enhanced journaling process can enable other client applications on the same host system 102(1) to access metadata resources (A) and (B) immediately upon commit completion, thereby mitigating the concern of keeping resources (A) and (B) locked for an inordinate amount of time (note that clients on other, remote host systems will still need to wait for the replay phase to be completed before they can access the modified metadata resources from storage tier 104).

It should be appreciated that FIGS. 1 and 2 are illustrative and not intended to limit the scope of the present disclosure. For example, although not explicitly shown, in certain embodiments client applications 106(1)-(M) may correspond to guest applications running within one or more virtual machines (VMs) and CFS layer 108 may part of a virtualization hypervisor. As another example, the various entities shown in FIGS. 1 and 2 may be arranged according to different configurations and may have subcomponents or functions that are not specifically described. One of ordinary skill in the art will recognize other modifications, variations, and alternatives.

3. Commit Workflow

Figure 3:
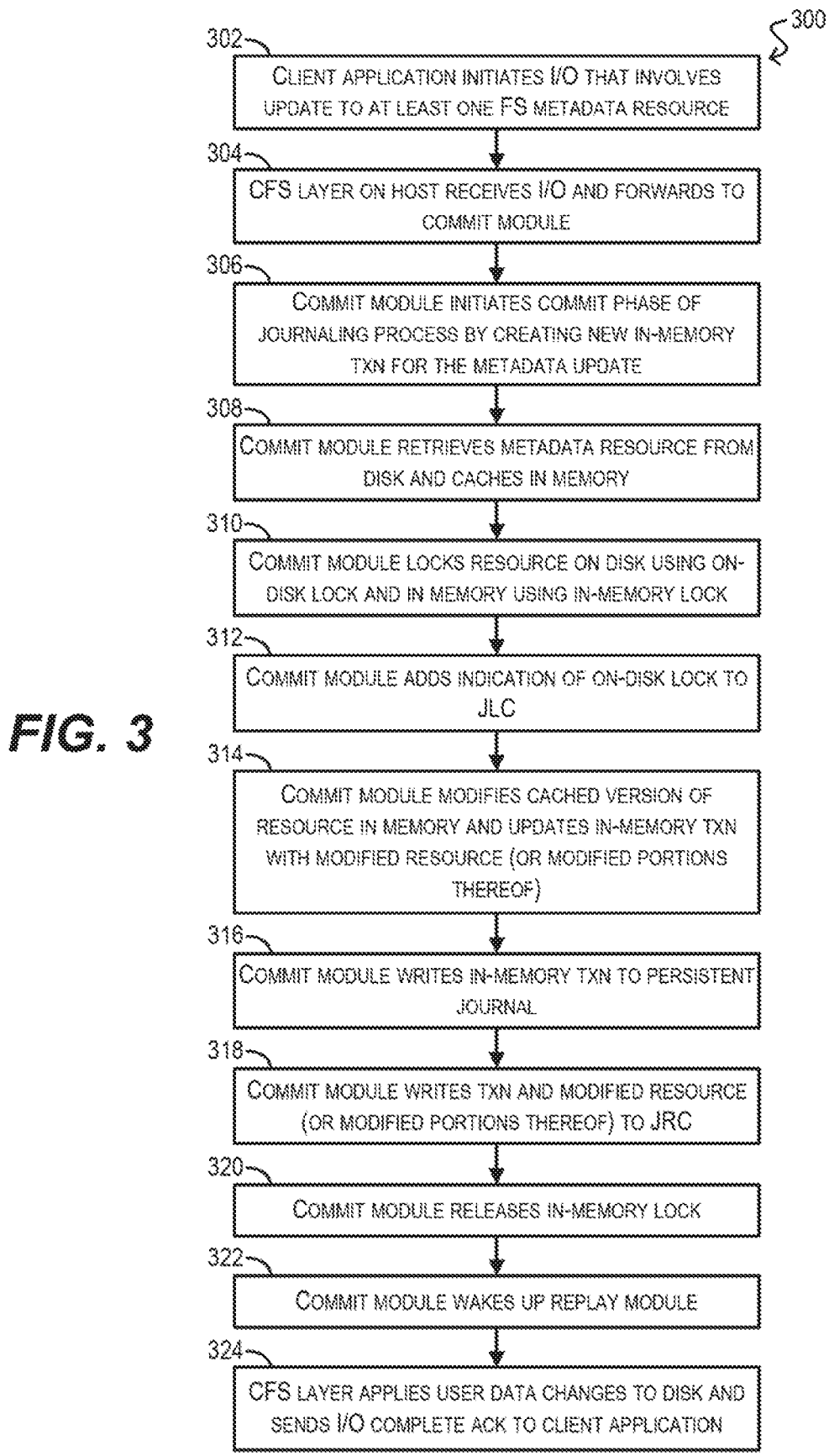
FIG. 3 depicts a commit workflow that may be executed by the enhanced commit module of FIG. 2 according to an embodiment.

FIG. 3 depicts an enhanced commit workflow 300 that may be executed by commit module 202 of FIG. 2 for carrying out the commit phase of a journaling process for a file system metadata update according to an embodiment. As mentioned with respect to FIG. 2, this enhanced commit workflow can allow journaling component 200 to decouple the commit phase from the replay phase and thereby reduce the latency for metadata-related I/O operations.

Starting with block 302, a client application (e.g., client application 106(1) of host system 102(1) shown in FIG. 1) can initiate a file I/O operation that involves an update to at least one file system metadata resource stored on disk (i.e., on storage tier 104). For example, the file I/O operation may be a write to a file and the file system metadata resource may be some metadata attribute of the file that is changed by the write.

At block 304, the I/O can be received by a CFS layer in the I/O path of the client application (e.g., CFS layer 108(1)) and the CFS layer can forward the I/O to commit module 202.

At blocks 306 and 308, commit module 202 can initiate the commit phase by creating a new in-memory transaction for the update to the file system metadata resource, retrieving the metadata resource from disk, and caching the retrieved metadata resource in an in-memory cache (i.e., the previously mentioned FRC).

Commit module 202 can then lock the metadata resource on disk using an on-disk lock (if it is not already locked there) and can lock the cached copy of the resource in the FRC using an in-memory lock (block 310). The purpose of the on-disk lock is to prevent other clients from accessing the same metadata resource from storage tier 104 before the update to the resource is reflected on disk. The purpose of the in-memory lock is to prevent other threads/applications running on the same host system from modifying the same resource concurrently in memory (i.e., in the FRC).

At block 312, commit module 202 can also add an indication of the on-disk lock created at block 310 to JLC 208. The purpose of this step is to track, via JLC 208, that the metadata resource is in the process of being updated but the update has not yet been replayed. If an indication of the on-disk lock for this particular metadata resource already exists in JLC 208, commit module 202 can increment a reference counter associated with the lock in JLC 208.

Once the on-disk and in-memory locks have been created and JLC 208 has been updated, commit module 202 can modify the cached version of the metadata resource in the FRC as needed (i.e., in accordance with the file I/O received at block 304) and can update the in-memory transaction created at block 306 with the modified metadata resource (block 314). In certain embodiments, rather than including the entirety of the modified metadata resource in the transaction, commit module 202 may only include the modified portions of the resource. A particular technique for achieving this (referred to as "granular resource logging") is described in section 3.A below. Further, as part of updating the in-memory transaction, commit module 202 can assign a unique sequence number to the transaction based on a monotonically increasing sequence.

Commit module 202 can then write the in-memory transaction to a persistent journal on storage tier 104, thereby committing the transaction to the journal (block 316), and write a copy of the updated metadata resource (or the updated portions thereof), along with the transaction itself, to JRC 206 (block 318). The purpose of step 318 is to maintain, within JRC 206, a consistent copy of the updated metadata resource and the committed transaction for use by replay module 204 during the replay phase. Note that replay module 204 cannot rely on the version of the metadata resource cached in the FRC for the replay phase, since the FRC version may be updated again with not-yet-committed changes by a different client application while the replay phase is running.

In certain embodiments, if a previous version of the same metadata resource already exists in JRC 206, commit module 202 may only write the updated portions of the resource to JRC 206 (per the granular resource logging feature mentioned above and detailed below); otherwise, the entirety of the metadata resource may be written to JRC 206. Stated another way, JRC 206 can maintain incremental updates to the same metadata resource. For example, if metadata resource R1 is updated via three separate transactions, JRC 206 can maintain three versions of R1 comprising the incremental updates for each transaction. For each incremental update, commit module 202 can update a reference counter for that resource in JRC 206 (in a manner similar to JLC 208).

After the transaction has been written to the journal and JRC 206, commit module 202 can release the in-memory (FRC) lock created at block 310 (block 320). By releasing this in-memory lock, other client applications running on the same host system can be free to access/update the metadata resource in the FRC.

Finally, at blocks 322 and 324, commit module 202 can wake up replay module 204 (so that module 204 can run the replay phase at some future point in time), the CFS layer can apply to storage tier 104 any user data changes required by the I/O, and the CFS layer can send an I/O complete acknowledgement to the initiating client application.

3.A Granular Resource Logging During Commit

Figure 4:
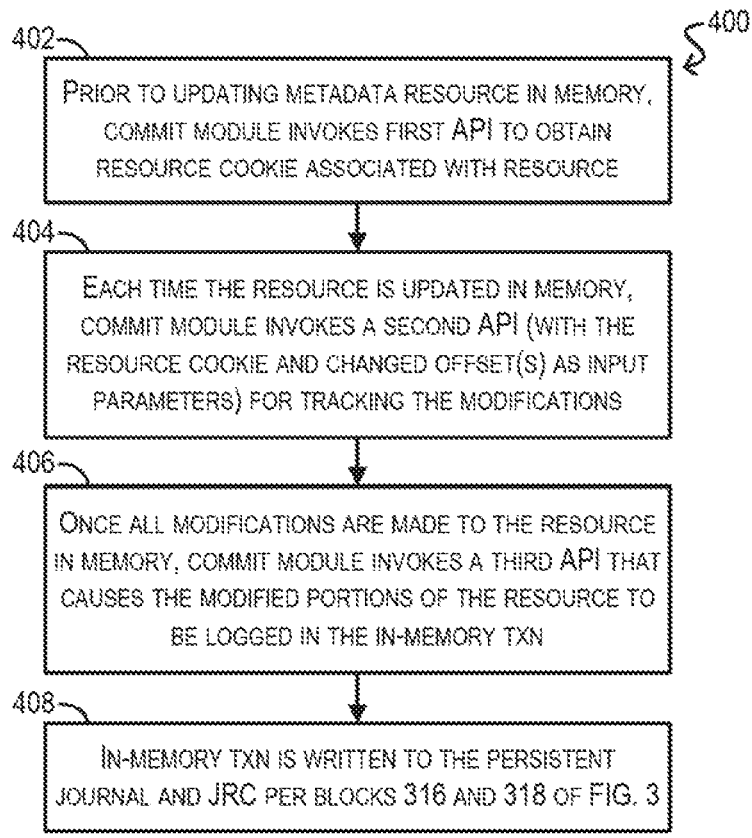
FIG. 4 depicts a granular resource logging workflow that may be executed by the enhanced commit module of FIG. 2 according to an embodiment.

As noted above, in certain embodiments commit module 202 can use, during commit workflow 300, "granular resource logging" to record only the modified portions of each updated metadata resource to the on-disk journal and JRC 206. With this feature, the amount of system memory and disk storage needed for journaling successive transactions that modify the same metadata resource can be significantly reduced, which in turn allows the system to support a larger number of transactions than otherwise possible for a given amount of journal and system memory space. FIG. 4 depicts a workflow 400 for implementing granular resource logging in the context of commit workflow 300 of FIG. 3 according to an embodiment.

At block 402, commit module 202 can invoke, prior to updating the version of the metadata resource in the FRC (per block 314 of workflow 300), a first API to obtain a resource cookie associated with the metadata resource. This resource cookie functions as an identifier for the metadata resource in memory.

At block 404, each time the metadata resource is updated in the FRC, commit module 202 can invoke a second API with the reference cookie and the changed resource offset(s) as input parameters. The invocation of this second API can track the modifications made to the metadata resource (e.g., changed offsets and the values at those offsets).

Once all changes are made to the metadata resource in the FRC, commit module 202 can invoke a third API that passes the reference cookie as an input parameter (block 406). The invocation of this third API can cause the changed portions of the metadata resource (rather that the entirety of the resource) to be logged to the in-memory transaction created at block 306 of workflow 300. The transaction (with only the changed portions) can then be propagated to the on-disk journal and JRC 206 per blocks 316 and 318 of workflow 300 (block 408).

4. Replay Workflow

Figure 5:
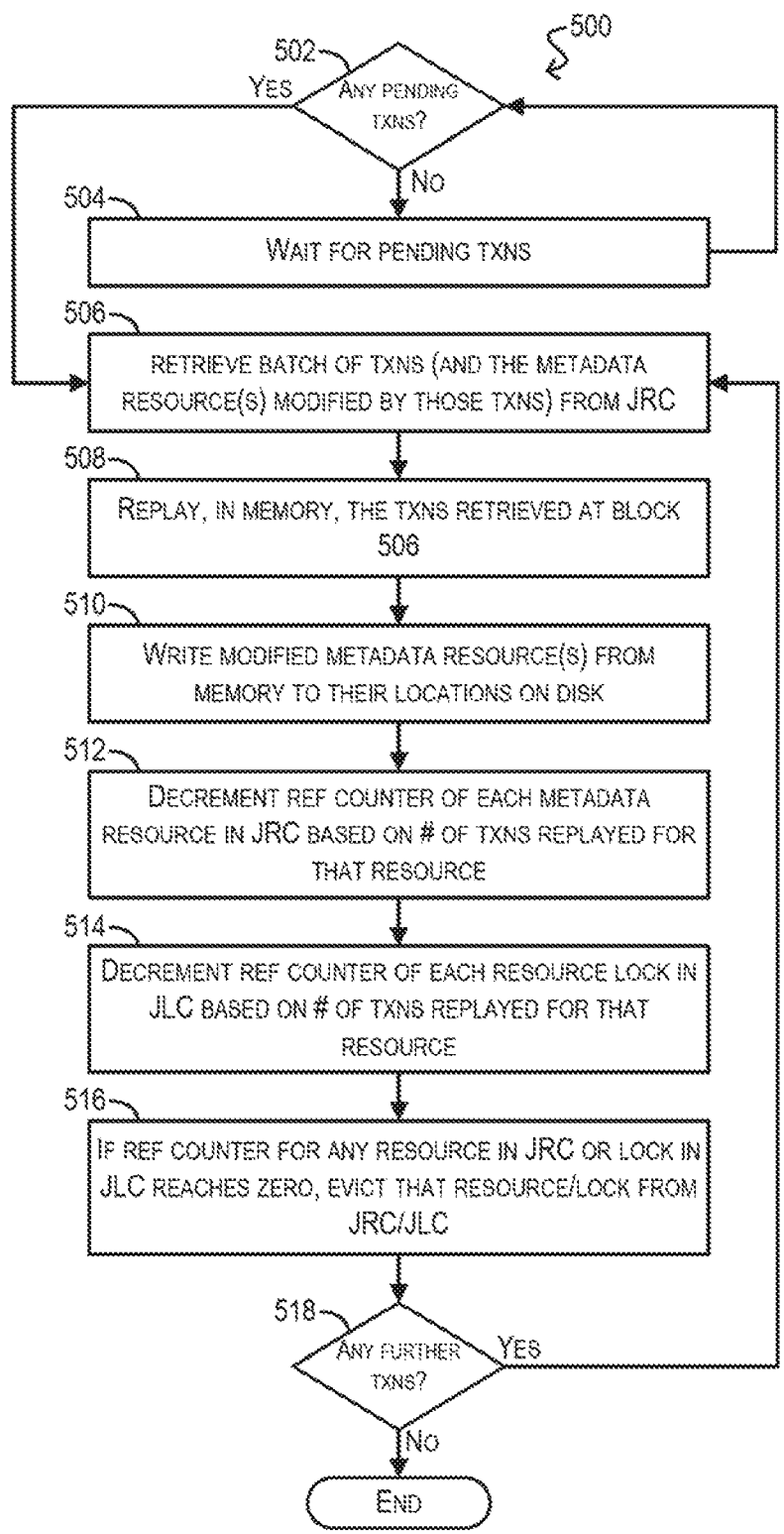
FIG. 5 depicts a replay workflow that may be executed by the enhanced replay module of FIG. 2 according to an embodiment.

FIG. 5 depicts an enhanced replay workflow 500 that may be executed by replay module 204 of FIG. 2 for carrying out the replay phase of the file system metadata update(s) committed via commit workflow 300 of FIG. 3 according to an embodiment. Replay workflow 500 can be carried out at any point in time after commit workflow 300 and thus does not need to immediately follow execution of workflow 300.

At block 502, replay module 204 can first check whether JRC 206 includes any pending file system metadata update transactions (i.e., transactions which have been committed but not yet replayed). If not, replay module 204 can wait for pending transactions to appear (block 504). Otherwise, replay module 204 can retrieve a batch of one or more pending transactions, as well as the metadata resources modified by those transactions, from JRC 206 (block 506).

At block 508, replay module 204 can "replay," in system memory, the transaction(s) retrieved at block 506. In other words, replay module 204 can cumulatively apply, to each metadata resource, the updates to that resource as defined in the retrieved transaction(s). This replay process can be performed in an order defined by transaction sequence number (e.g., from lowest to highest) to ensure that the updates are applied to each metadata resource in the correct sequence (one exception to this is explained in section 5.C below). The purpose of block 508 is to aggregate all of the updates to each metadata resource in memory prior to writing the resource to disk (i.e., storage tier 104), which reduces the total number of disk I/O required for the replay phase.

At block 510, replay module 204 can write the modified metadata resources from memory to storage tier 104, thereby propagating those versions to disk. Replay module 204 can also decrement the reference counter of each metadata resource in JRC 206 based on the number of transactions replayed for that resource (block 512), and decrement the reference counter for the lock of each metadata resource in JLC 208 based on the number of transactions replayed for that resource (block 514).

If the reference counter for any metadata resource in JRC 206 reaches zero, replay module 204 can evict that resource from JRC 206 (i.e., delete/free all information pertaining to that resource) (block 516). Further, if the reference counter for any lock in JLC 208 reaches zero, replay module 204 can evict that lock from JLC 208 (block 516); this allows the corresponding metadata resource to be evicted from the FRC, which in turn allows the on-disk lock for the resource to be released (and thereby enables client applications to access the metadata resource from disk again).

Finally, at block 518, replay module 204 can check for any additional transactions or batches of transactions in JRC 206. If additional transactions exist, replay module 204 can return to block 506 and repeat replay workflow 500 for those transactions. Otherwise, replay workflow 500 can end (or alternatively loop back to block 504 to wait for new transactions).

5. Additional Features/Enhancements

The remainder of this disclosure describes additional features/enhancements that may be implemented with respect to the enhanced commit and replay workflows described above.

5.A. Avoiding Metadata Staleness

Since JRC 206 of FIG. 2 caches all of the metadata resources and corresponding transactions that are committed to the on-disk journal but not yet replayed, in certain embodiments all file system metadata requests that are initiated by client applications can be processed from (i.e., read from) JRC 206, rather than from storage tier 104. This ensures that the latest committed metadata will be returned to the requesting applications. If a requested metadata resource is not in JRC 206, the read request can be fulfilled from storage tier 104 (assuming that the resource is not locked on disk).

5.B Pending Transactions to File

In some scenarios, a client application may decide to close a file after performing several operations on the file. Due to the asynchronous execution of the replay phase as described above, there may be one or more pending metadata transactions for the file (i.e., transactions that have been committed but not yet replayed) at the time of file closure. Since the file close operation, by definition, is supposed to make the entire contents of the file persistent, the pending transactions should be replayed before the file close operation is completed.

For this purpose, in one set of embodiments, journaling component 200 of FIG. 2 can maintain a list of pending metadata transactions on a per-file-basis. This file-level transaction information can be stored in JRC 206 or some other location and can be updated during the commit and replay workflows to add or remove transactions accordingly.

Then, at the time of receiving a request to close a given file F1, the CFS layer can simply retrieve the pending transaction list for F1 rather than searching all of the transactions stored in JRC 206. In this way, the CFS layer can quickly identify the pending transactions for F1 and force the replay of each of those transactions.

5.C High Priority Transactions

In some clustered file systems, certain types of metadata update transactions may be considered higher priority than others. For example, in VMware's VMFS (Virtual Machine File System), the conversion of Large File Block Clusters (LFBCs) to Small File Block Clusters (SFBCs) is considered high priority because LFBCs are relatively scarce resources and thus it is expensive to hold locks on LFBCs for a long period of time.

One way to prioritize high priority transactions is to mark them as such and to replay the high priority transactions first (i.e., before other, lower priority transactions) during replay workflow 500 of FIG. 5. However, a complication with this approach is that multiple transactions in JRC 206 may be dependent on each other; for example, they may modify the same metadata resource. Therefore, blindly replaying transactions "out of order" (i.e., not in accordance with transaction sequence number) may cause metadata corruption, since such out-of-order execution may result in an incorrect final value for the resource.

Figure 6:
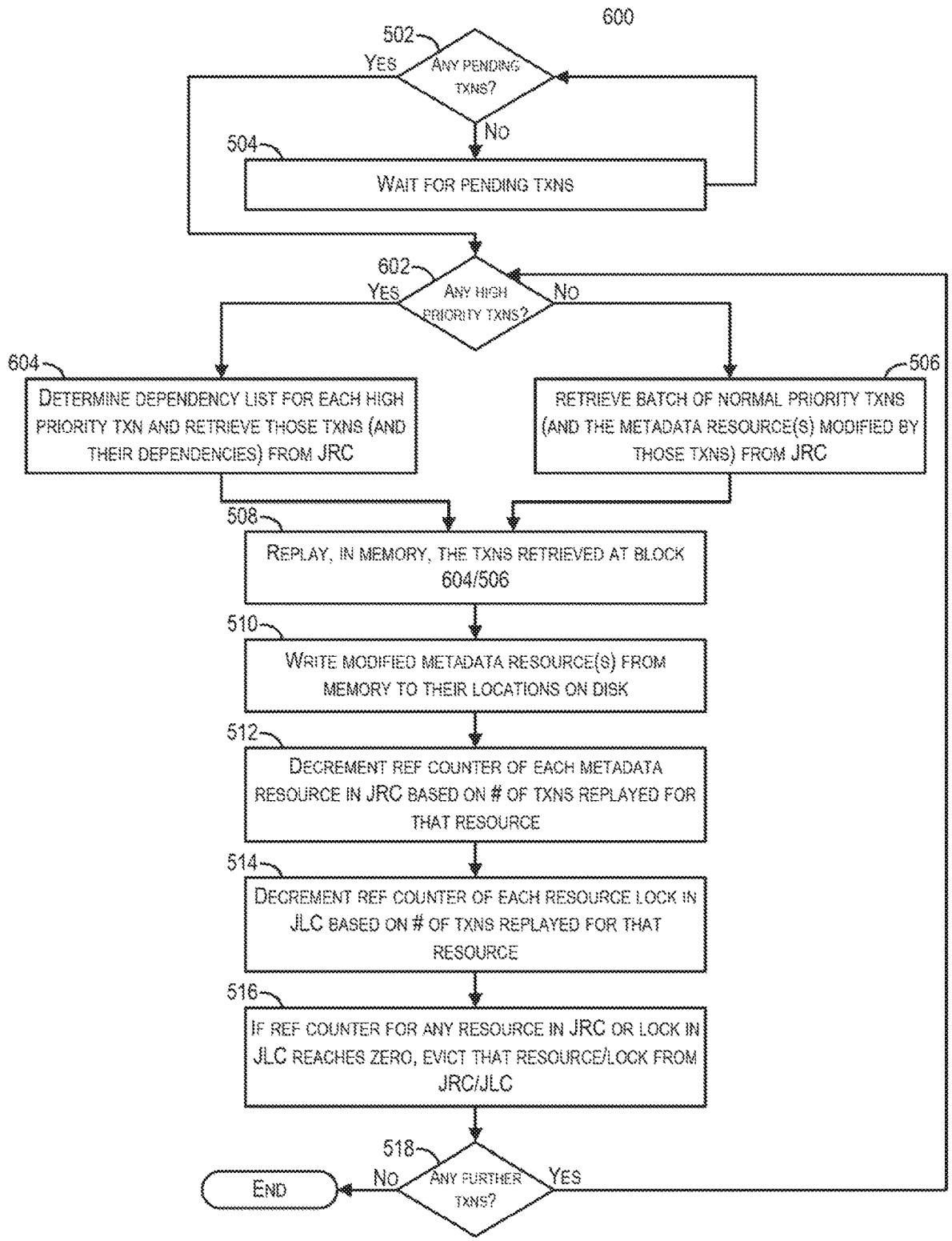
FIG. 6 depicts a modified version of the replay workflow of FIG. 5 that supports intelligent out-of-order replay of high priority transactions according to an embodiment.

To address this, FIG. 6 depicts a modified version of replay workflow 500 (shown as workflow 600) that supports intelligent out-of-order replay of high priority transactions according to an embodiment. The majority of the steps of workflow 600 are similar to workflow 500, however, prior to block 506, replay module 204 can check whether there are any high priority transactions pending (block 602). If so, replay module 204 can determine a dependency list for each high priority transaction, where the dependency list includes all of the transactions in JRC 206 that must be replayed before the high priority transaction. Replay module 204 can then retrieve the high priority transactions (and the transactions on which they depend) from JRC 206 (block 604) and proceed with replaying those transactions (block 508 onward).

If there are no high priority transactions pending at block 602, replay module 204 can proceed with replaying the normal priority transactions as shown in block 506 and onward.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for decoupling commit and replay of file system metadata updates, the method comprising:
    receiving, by a clustered file system (CFS) layer of a computer system, a file I/O operation from a client application, the file I/O operation involving an update to a file system metadata resource maintained on persistent storage;
    executing, by a journaling component of the CFS layer, a commit phase for committing the update to a journal on the persistent storage, the executing of the commit phase comprising:
        retrieving the file system metadata resource from the persistent storage and caching the retrieved file system metadata resource in a first in-memory cache;
        modifying the cached file system metadata resource in the first in-memory cache in accordance with the file I/O operation;
        updating an in-memory transaction with the modified version of the cached file system metadata resource;
        writing the in-memory transaction to the journal; and
        writing the in-memory transaction and the modified version of the cached file system resource to a second in-memory cache different from the first in-memory cache; and
    after completing the executing of the commit phase, returning, by the CFS layer, an acknowledgment to the client application indicating that the file I/O operation is complete, wherein the acknowledgement is returned prior to completion of a replay phase configured to propagate the update from the journal to one or more locations on the persistent storage where the file system metadata resource is stored.

2. The method of claim 1 wherein executing the commit phase further comprises:
    locking the file system metadata resource on the persistent storage using an on-disk lock;
    locking the file system metadata resource in the first in-memory cache using an in-memory lock; and
    adding an indication of the on-disk lock to a third in-memory cache.

3. The method of claim 2 wherein executing the commit phase further comprises:
    subsequently to writing the in-memory transaction and the modified version of the cached file system resource to the second in-memory cache, releasing the in-memory lock.

4. The method of claim 3 wherein writing the in-memory transaction to the journal and to the second in-memory cache comprises:
    writing only modified portions of the file system metadata resource.

5. The method of claim 3 further comprising executing the replay phase at some point after the commit phase, wherein executing the replay phase comprises:
    retrieving a batch of one or more transactions from the second in-memory cache;
    replaying, in memory, the batch of one or more transactions, resulting in a replayed version of the file system metadata resource; and
    writing the replayed version of the file system metadata resource to the one or more locations on the persistent storage where the file system metadata resource is stored.

6. The method of claim 5 wherein executing the replay phase further comprises:
    decrementing a reference counter associated with each file system metadata resource in the second in-memory cache based on a number of transactions replayed for said each file system metadata resource;
    decrementing a reference counter associated with each file system metadata resource lock in the third in-memory cache based on the number of transactions replayed for said each file system metadata resource;
    if the reference counter for any file system metadata resource in the second in-memory cache reaches zero, evicting that file system metadata resource from the second in-memory cache; and
    if the reference counter for any file system metadata resource lock in the third in-memory cache reaches zero, evicting that file system metadata resource lock from the third in-memory cache.

7. The method of claim 5 wherein, prior to retrieving the batch of one or more transactions, executing the replay phase further comprises:
    determining that the second in-memory cache includes one or more high priority transactions;
    constructing a dependency list for each high priority transaction, the dependency list identifying one or more other transactions that must be replayed before the high priority transaction; and
    for each high priority transaction, replaying the transactions in the dependency list and the high priority transaction.

8. A non-transitory computer readable storage medium having stored thereon program code executable by a computer system, the program code embodying a method for decoupling commit and replay of file system metadata updates, the method comprising:
    receiving, by a clustered file system (CFS) layer of the computer system, a file I/O operation from a client application, the file I/O operation involving an update to a file system metadata resource maintained on persistent storage;
    executing, by a journaling component of the CFS layer, a commit phase for committing the update to a journal on the persistent storage, the executing of the commit phase comprising:
        retrieving the file system metadata resource from the persistent storage and caching the retrieved file system metadata resource in a first in-memory cache;
        modifying the cached file system metadata resource in the first in-memory cache in accordance with the file I/O operation;
        updating an in-memory transaction with the modified version of the cached file system metadata resource;
        writing the in-memory transaction to the journal; and writing the in-memory transaction and the modified version of the cached file system resource to a second in-memory cache different from the first in-memory cache; and after completing the executing of the commit phase, returning, by the CFS layer, an acknowledgment to the client application indicating that the file I/O operation is complete, wherein the acknowledgement is returned prior to completion of a replay phase configured to propagate the update from the journal to one or more locations on the persistent storage where the file system metadata resource is stored.

9. The non-transitory computer readable storage medium of claim 8 wherein executing the commit phase further comprises:
locking the file system metadata resource on the persistent storage using an on-disk lock;
locking the file system metadata resource in the first in-memory cache using an in-memory lock; and
adding an indication of the on-disk lock to a third in-memory cache.

10. The non-transitory computer readable storage medium of claim 9 wherein executing the commit phase further comprises:
subsequently to writing the in-memory transaction and the modified version of the cached file system resource to the second in-memory cache, releasing the in-memory lock.

11. The non-transitory computer readable storage medium of claim 10 wherein writing the in-memory transaction to the journal and to the second in-memory cache comprises:
writing only modified portions of the file system metadata resource.

12. The non-transitory computer readable storage medium of claim 10 wherein the method further comprises executing the replay phase at some point after the commit phase, and wherein executing the replay phase comprises:
retrieving a batch of one or more transactions from the second in-memory cache;
replaying, in memory, the batch of one or more transactions, resulting in a replayed version of the file system metadata resource; and
writing the replayed version of the file system metadata resource to the one or more locations on the persistent storage where the file system metadata resource is stored.

13. The non-transitory computer readable storage medium of claim 12 wherein executing the replay phase further comprises:
decrementing a reference counter associated with each file system metadata resource in the second in-memory cache based on a number of transactions replayed for said each file system metadata resource;
decrementing a reference counter associated with each file system metadata resource lock in the third in-memory cache based on the number of transactions replayed for said each file system metadata resource;
if the reference counter for any file system metadata resource in the second in-memory cache reaches zero, evicting that file system metadata resource from the second in-memory cache; and
if the reference counter for any file system metadata resource lock in the third in-memory cache reaches zero, evicting that file system metadata resource lock from the third in-memory cache.

14. The non-transitory computer readable storage medium of claim 12 wherein, prior to retrieving the batch of one or more transactions, executing the replay phase further comprises:
determining that the second in-memory cache includes one or more high priority transactions;
constructing a dependency list for each high priority transaction, the dependency list identifying one or more other transactions that must be replayed before the high priority transaction; and
for each high priority transaction, replaying the transactions in the dependency list and the high priority transaction.

15. A computer system comprising:
a processor; and
a non-transitory computer readable medium having stored thereon program code for decoupling commit and replay of file system metadata updates, the program code causing the processor to:
receive a file I/O operation from a client application, the file I/O operation involving an update to a file system metadata resource maintained on persistent storage;
execute a commit phase for committing the update to a journal on the persistent storage, the executing of the commit phase comprising:
retrieving the file system metadata resource from the persistent storage and caching the retrieved file system metadata resource in a first in-memory cache;
modifying the cached file system metadata resource in the first in-memory cache in accordance with the file I/O operation;
updating an in-memory transaction with the modified version of the cached file system metadata resource;
writing the in-memory transaction to the journal; and
writing the in-memory transaction and the modified version of the cached file system resource to a second in-memory cache different from the first in-memory cache; and
after completing the executing of the commit phase, return an acknowledgment to the client application indicating that the file I/O operation is complete, wherein the acknowledgement is returned prior to completion of a replay phase configured to propagate the update from the journal to one or more locations on the persistent storage where the file system metadata resource is stored.

16. The computer system of claim 15 wherein executing the commit phase further comprises:
locking the file system metadata resource on the persistent storage using an on-disk lock;
locking the file system metadata resource in the first in-memory cache using an in-memory lock; and
adding an indication of the on-disk lock to a third in-memory cache.

17. The computer system of claim 16 wherein executing the commit phase further comprises:
subsequently to writing the in-memory transaction and the modified version of the cached file system resource to the second in-memory cache, releasing the in-memory lock.

18. The computer system of claim 17 wherein writing the in-memory transaction to the journal and to the second in-memory cache comprises:

writing only modified portions of the file system metadata resource.

19. The computer system of claim 17 wherein the program code further comprises code that causes the processor to execute the replay phase at some point after the commit phase, and wherein executing the replay phase comprises:
retrieving a batch of one or more transactions from the second in-memory cache;
replaying, in memory, the batch of one or more transactions, resulting in a replayed version of the file system metadata resource; and
writing the replayed version of the file system metadata resource to the one or more locations on the persistent storage where the file system metadata resource is stored.

20. The computer system of claim 19 wherein executing the replay phase further comprises:
decrementing a reference counter associated with each file system metadata resource in the second in-memory cache based on a number of transactions replayed for said each file system metadata resource;
decrementing a reference counter associated with each file system metadata resource lock in the third in-memory cache based on the number of transactions replayed for said each file system metadata resource;
if the reference counter for any file system metadata resource in the second in-memory cache reaches zero, evicting that file system metadata resource from the second in-memory cache; and
if the reference counter for any file system metadata resource lock in the third in-memory cache reaches zero, evicting that file system metadata resource lock from the third in-memory cache.

21. The computer system of claim 19 wherein, prior to retrieving the batch of one or more transactions, executing the replay phase further comprises:
determining that the second in-memory cache includes one or more high priority transactions;
constructing a dependency list for each high priority transaction, the dependency list identifying one or more other transactions that must be replayed before the high priority transaction; and
for each high priority transaction, replaying the transactions in the dependency list and the high priority transaction.

* * * * *